(12) United States Patent
Gamble

(10) Patent No.: US 7,874,374 B2
(45) Date of Patent: Jan. 25, 2011

(54) TURF AERATOR TINE

(75) Inventor: Dan L. Gamble, Noblesville, IN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 12/006,289

(22) Filed: Dec. 31, 2007

(65) Prior Publication Data

US 2009/0166049 A1    Jul. 2, 2009

(51) Int. Cl.
*A01B 45/02*    (2006.01)
(52) U.S. Cl. ........................................................ 172/22
(58) Field of Classification Search ................. 172/21, 172/22, 371; 175/249, 20; 73/864.44, 864.41; D7/693, 695, 696
See application file for complete search history.

(56) References Cited

U.S. PATENT DOCUMENTS

| 287,677 | A |   | 10/1883 | Higinbotham et al. |   |
|---|---|---|---|---|---|
| 1,568,008 | A | * | 12/1925 | Thomas | 30/113.3 |
| 1,581,310 | A | * | 4/1926 | Fetschan | 30/303 |
| 2,057,067 | A | * | 10/1936 | Smith | 294/50.7 |
| 2,057,142 | A | * | 10/1936 | Fry | 172/22 |
| 2,282,673 | A | * | 5/1942 | Peterson | 294/50.7 |
| 2,362,090 | A | * | 11/1944 | Peters | 73/864.44 |
| 2,686,690 | A |   | 8/1954 | Kushnir |   |
| 3,011,563 | A | * | 12/1961 | Ceretti et al. | 172/22 |
| 3,127,939 | A |   | 4/1964 | Rink |   |
| 3,198,719 | A |   | 8/1965 | Stewart |   |
| 3,291,231 | A |   | 12/1966 | Kammer |   |
| 3,847,227 | A |   | 11/1974 | Myers |   |
| 4,881,602 | A |   | 11/1989 | Hansen et al. |   |
| 4,924,944 | A | * | 5/1990 | Cozine et al. | 172/22 |
| 5,868,206 | A | * | 2/1999 | Miller | 172/21 |
| RE37,321 | E | * | 8/2001 | Poltielov | 99/494 |
| 7,159,320 | B2 | * | 1/2007 | Moore | 30/113.1 |

FOREIGN PATENT DOCUMENTS

| JP | 2003325035 | 11/2003 |
|---|---|---|
| JP | 2003339204 | 12/2003 |
| WO | 03094590 | 11/2003 |

* cited by examiner

*Primary Examiner*—Robert E Pezzuto
*Assistant Examiner*—Matthew D Troutman
(74) *Attorney, Agent, or Firm*—James W. Miller

(57) ABSTRACT

A tine for a turf aerator comprises a hollow, generally cylindrical tine having a lower section that first contacts the ground as the tine is driven into the ground with the lower section having an open bottom mouth. The tine includes an aeration core exit. A core comprising a splitting or dividing wall is fixedly carried within the hollow tine to split or divide the aeration core into at least two sub-cores or pieces thereof, which are subsequently ejected from the tine through the exit. These two sub-cores dry more quickly than the single larger aeration core that would have been formed and ejected had the core splitter been absent.

9 Claims, 5 Drawing Sheets

TURF AERATOR TINE

TECHNICAL FIELD

This invention relates to a turf aerator for punching aeration holes into the ground to relieve compaction of the turf, to facilitate the entry of air and water into the turf, and to thereby enhance the growth and health of the turf. More particularly, this invention relates to the tines used on the aerator for forming the aeration holes.

BACKGROUND OF THE INVENTION

It is well known in the turf care industry that the health of the turf can be enhanced by periodically aerating the turf. Aerating the turf involves punching an array of spaced holes into the ground over the area of the turf that is to be aerated. Such aeration holes relieve soil compaction and facilitate the entry of air and water into the turf. This has a beneficial effect on the turf and leads to healthier, more vigorous turf.

Various aerators have been developed for aerating turf areas. One aerator uses a vertically reciprocal array of tines that first punch down into the ground and then are lifted up out of the ground to form the aeration holes as the aerator moves over the turf area. The tines are arranged in groups on different tine holders that are reciprocated up and down out of phase with one another. U.S. Pat. Nos. 6,561,282 and 7,096,969, both owned by The Toro Company, the assignee of this application, disclose aerators with vertically reciprocal tine arrays. Toro also makes and sells aerators of this type as in its ProCore 648 aerator among others.

Another type of aerator involves rotary discs that carry tines around the periphery thereof. Each disc carries a plurality of tines that radially extend outwardly along different radii of each disc. As the discs roll over the ground, the tines carried on the discs sequentially punch down into the ground and then lift out of the ground by virtue of the rotation of the discs. Such rotary aerators are also made and sold by The Toro Company, namely Toro's Model 686 and 687 aerators.

One type of tine used in conjunction with such aerators is a hollow tine designed to pull up a generally cylindrical aeration core from the turf. Each aeration core typically includes an upper grassy or plant containing layer and a lower soil layer that underlies and comes up with the upper layer. Such hollow tines deposit the aeration cores which they pull out of the turf back down onto the surface of the turf. Thus, following the completion of an aeration operation, the surface of the turf will be covered or littered with a large number of aeration cores. The aeration cores will cover the turf surface wherever they fell and are spaced from one another atop the turf surface in various rows and columns of cores.

The aeration cores left by an aerator can be left on top of the turf surface where they will gradually decompose and erode back into the turf surface. Simply leaving the cores in place is often done in a homeowner's yard after the yard has been aerated. The aeration cores will gradually erode or disintegrate over time and fall back down into the canopy of the turf surface. Unfortunately, this can take some time to do since known aeration cores are relatively thick having a diameter of an inch or so.

In other areas where the grass is cut quite short and the turf surface sees relatively heavy and constant use, such as the greens and fairways of golf courses or the surfaces of sports fields such as soccer fields, it is not desirable to simply leave the cores in place to erode over time. Instead, the cores are usually positively broken up and dispersed down into the turf surface. This permits the turf surface to quickly return to its normal state to allow continued use thereof, namely to allow play to resume on the greens or fairways of the golf course or on the surfaces of the sports fields.

Various methods of treating the aeration cores left on the ground have been adopted and used in the past. In one case, a drag mat or the like is dragged over the turf surface, and thus over the cores lying on the turf surface, to break up the cores into pieces and to force these smaller pieces back down into the turf surface. Alternatively, various powered machines have been developed that will mechanically disintegrate the cores by the operation of rotary flails or choppers, such as the machine shown in U.S. Pat. No. 4,905,460. In some of these machines, the cores are picked up off the ground, the upper grassy layer of the core is separated from the soil portion of the core, the soil portion of the core is disintegrated and deposited back down into the turf, and the grassy portions of the core are collected in a hopper. U.S. Pat. No. 6,142,240 to Underhill shows a core processor of this latter type.

It is more difficult to handle relatively wet and thick aeration cores in such core disintegrating machines. Wet aeration cores are more likely to plug or foul the operating parts of the machines requiring that the machines be stopped and cleaned. To avoid this from happening, the cores are usually left in place on the turf for a period of time needed for them to dry out. Dry cores can be processed and/or broken up much more easily. But, since each aeration core comprises a relatively thick, cylindrical core, it can take some time for the core to dry out as mentioned earlier. During this time, the turf surface may not be usable, particularly in the case of a fairway or green on a golf course. This is a disadvantage and a problem in the art of turf aeration.

SUMMARY OF THE INVENTION

One aspect of this invention relates to a tine for use on a turf aerator for aerating turf. The turf aerator movably mounts and drives the tine in a manner that pushes or punches the tine downwardly into the ground to form an aeration hole in the turf, lifts the tine out of the aeration hole so formed, and then periodically repeats the process to form additional aeration holes. The tine comprises a tine elongated along an axis of elongation. At least a portion of the tine is hollow. The hollow portion forms an aeration core out of the turf which core is received within the hollow portion as the tine is pushed or punched downwardly into the ground to form the aeration hole. At least one wall is located at least partially in the hollow portion of the tine. The wall is configured and arranged to split or divide the aeration core into at least two sub-cores. Each sub-core has a smaller cross-sectional area in a plane perpendicular to the axis of elongation than a corresponding cross-sectional area of the aeration core that would have been formed had the wall(s) been absent. At least one exit is provided in the tine with the exit communicating with the hollow portion of the tine for allowing the sub-cores to be ejected from the tine.

Another aspect of this invention relates to a tine for use on a turf aerator for aerating turf. The turf aerator movably mounts and drives the tine in a manner that pushes or punches the tine downwardly into the ground to form an aeration hole in the turf, lifts the tine out of the aeration hole so formed, and then periodically repeats the process to form additional aeration holes. The tine comprises a tine elongated along an axis of elongation. At least a portion of the tine is hollow having a predetermined cross-sectional area measured in a plane perpendicular to the axis of elongation. A wall is located at least partially in the hollow portion of the tine. The wall extends sufficiently across one dimension of the predetermined cross-sectional area to split or divide the predetermined cross-sectional area into at least two substantially separate cross-sectional areas that are each smaller than the predetermined cross-sectional area.

Yet another aspect of this invention relates to a tine for use on a turf aerator. The tine comprises a hollow tine having a lower section that first contacts the ground as the tine is driven into the ground with the lower section having an open bottom mouth. An aeration core exit is provided in the tine. A core splitting or dividing wall is fixedly carried within the hollow tine configured to split or divide an aeration core being formed within the tine into multiple pieces which are then ejected through the aeration core exit.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

FIGS. 1-6 disclose one embodiment of an aerator tine 2 according to this invention. Tine 2 can be used in various turf aerators for punching one aeration hole into a turf surface hole in an array of aeration holes that are provided by multiple tines 2 carried on the aerator.

Figure 8:
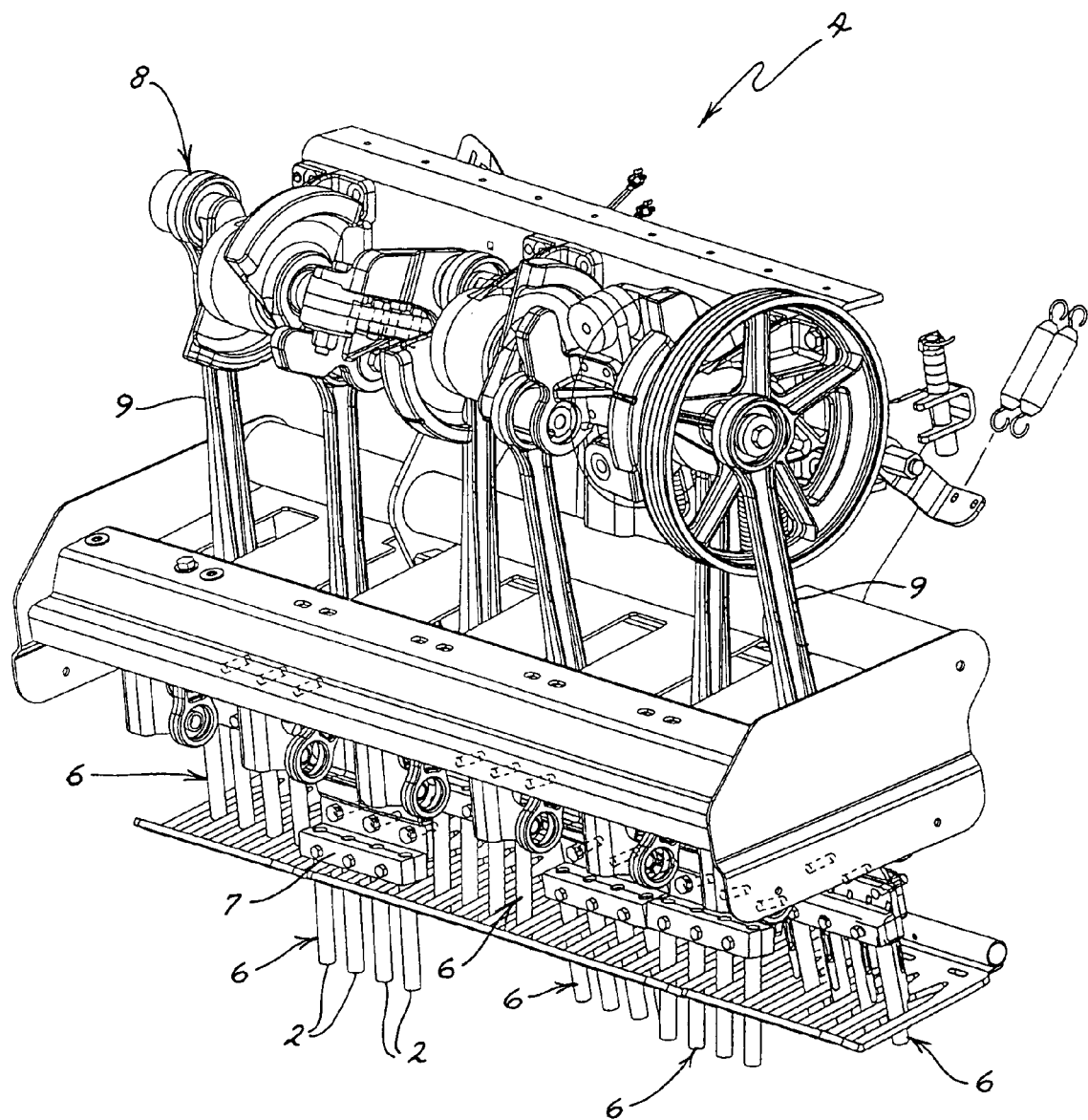
FIG. 8 is a perspective view of a portion of one type of aerator that can be equipped with the tine of FIG. 1.

FIG. 8 discloses one type of turf aerator 4 which uses tine 2 of this invention. A plurality of tines 2 are provided in small groups 6 that are mounted on tine holders 7. Tine holders 7 are vertically reciprocated upwardly and downwardly by a crankshaft assembly 8 having a plurality of drive arms 9 connected to tine holders 7. Each group 6 of tines 2 on each tine holder 7 will form a plurality of aeration holes in the turf when tines 2 are punched into the ground. Aerator 4 is designed to punch a wide swath of aeration holes into the turf as aerator 4 is moved over the ground either under its own power or by being connected to or carried by some other vehicle.

Aerator 4 carrying the vertically reciprocal groups 6 of tines 2 is further disclosed in the assignee's U.S. Pat. No. 7,096,969, which is hereby incorporated by reference. However, tine 2 is not limited for use in this type of aerator 4, but can be adapted for use in other aerators, such as aerators in which tines 2 are carried on rotary discs, as in the Model 686 and 687 aerators sold by the assignee of this invention.

Figure 1:
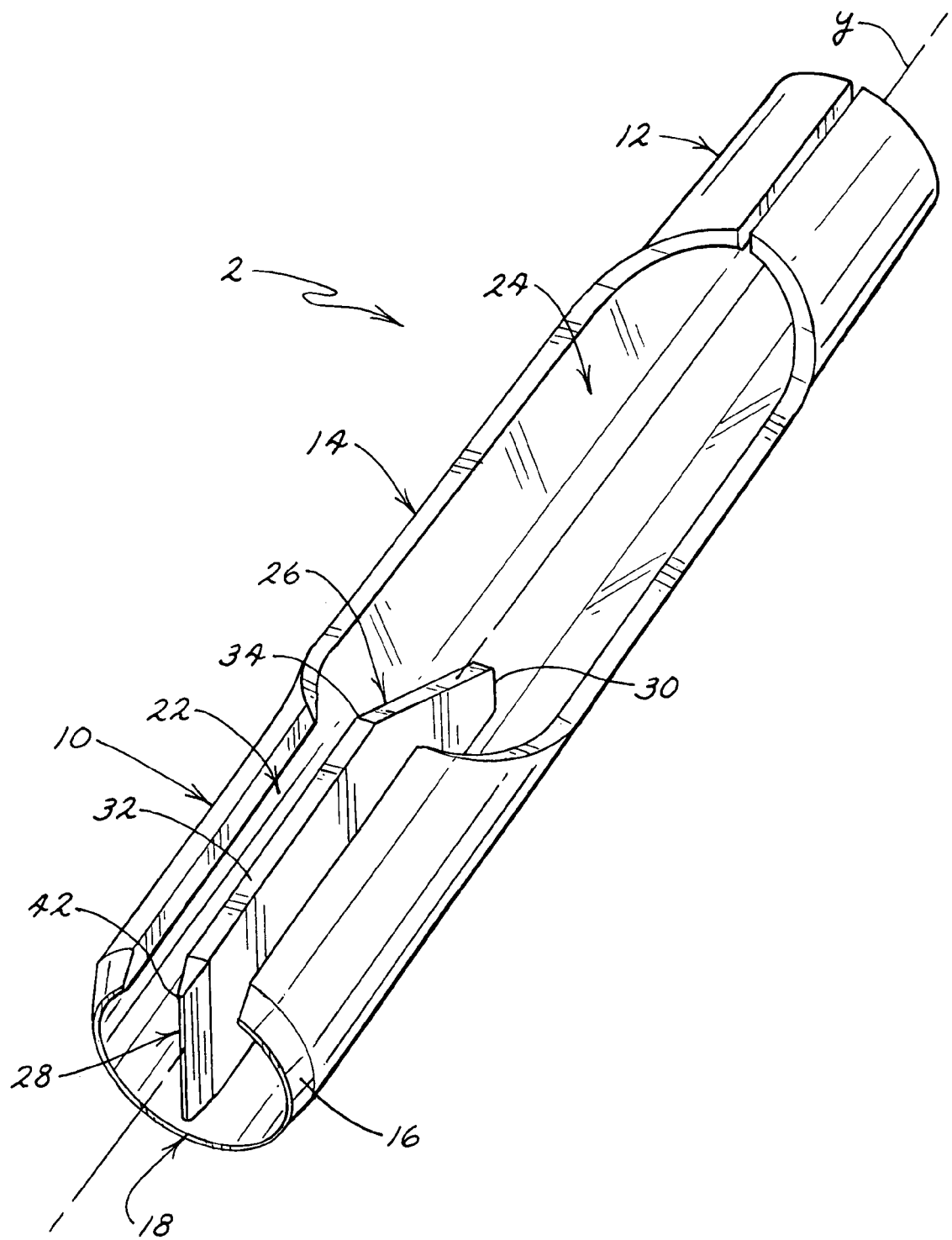
FIG. 1 is a perspective view of a turf aerator tine according to this invention.
Figure 2:
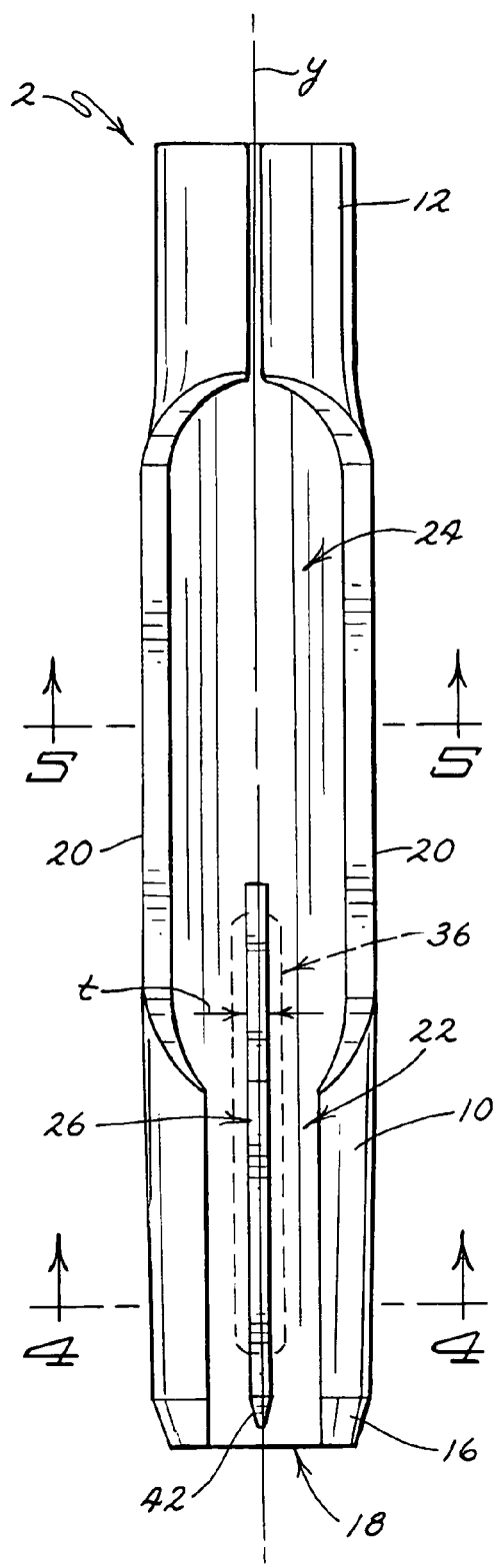
FIG. 2 is a top plan view of the tine of FIG. 1.

Referring now to FIGS. 1-6, each tine 2 is elongated along an axis of elongation identified as y in FIGS. 1 and 2. Tine 2 comprises a lower entrance section 10, an upper mounting section 12 for mounting tine 2 to tine holder 7, and a middle section 14 connecting the lower and upper sections of tine 2. Tine 2 is preferably hollow throughout its length. However, upper section 12 of tine 2 could be closed off by a cap or plug or by forming upper section 12 as a solid, non-hollow section of tine 2.

Lower section 10 of tine 2 has a short, inwardly chamfered bottom edge 16 with an open mouth 18 that first enters the ground when tine 2 is punched down into the ground. Thus, an aeration core comprising an upper grass or plant containing layer and an underlying soil layer is able to pass through open mouth 18 of tine 2 and hence into the hollow portion of tine 2. The aeration core is formed by the sidewall 20 of tine 2 as tine 2 punches or moves deeper into the ground. See FIGS. 6 and 7.

Lower section 10 of tine 2 is substantially, but not completely, circumscribed by sidewall 20 of tine 2. This leaves an open gap 22 along one side of lower section 10 of tine 2 along the length of lower section 10 of tine 2. When lower section 10 of tine 2 is cylindrical with an outer diameter of 1.00", gap 22 is preferably about 0.50" wide.

Middle section 14 of tine 2 includes an aeration core exit 24. Exit 24 comprises an open slot on one side of tine 2 running along the length of middle section 14 of tine 2. Thus, tine 2 shown herein is commonly referred to as a side eject tine due to the slot in one side of tine 2.

The slot forming aeration core exit 24 is preferably somewhat wider than gap 22 in lower section 10 of tine 2 and extends further down sidewall 20 of tine 2 along each side of tine 2. Thus, exit 24 formed in middle section 14 of tine 2 is cut both wider and deeper into tine 2 than gap 22 in lower section 10 of tine 2. Middle section 14 is slightly splayed or flared outwardly adjacent each side of exit 24 as depicted at 25 in FIG. 4. Exit 24 permits the aeration cores formed in tine 2 to be ejected from tine 20 laterally through sidewall 20 of tine 2 and to fall onto the turf surface.

Upper section 12 of tine 2 can have any shape or configuration suitable for mounting tine 2 to aerator 4. In the example of tine 2 shown herein, upper section 12 of tine 2 has a substantially closed shape that can be tightly gripped or clamped in a mating aperture in tine holder 7 to hold tine 2 in place. Preferably, upper section 12 of tine 2 will have a generally cylindrical shape and will be clamped within a cylindrical bore, aperture or collar carried in tine holder 7. Other mountings with significantly different shapes could be used.

Figure 6:
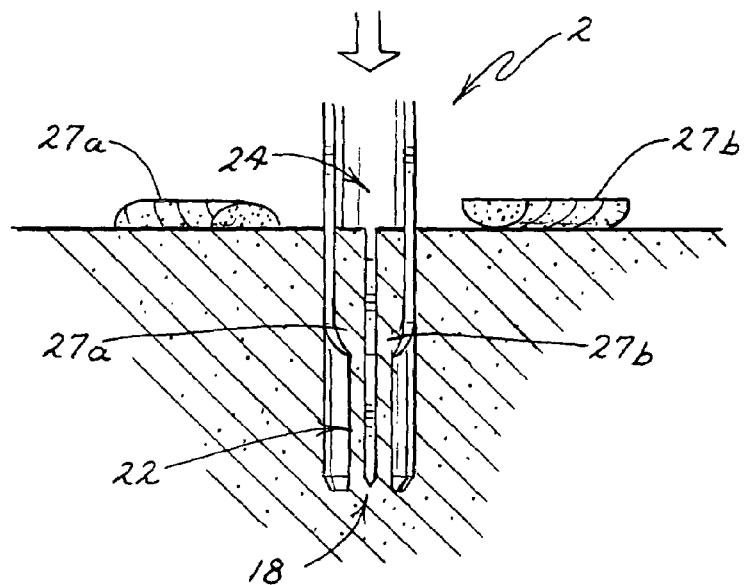
FIG. 6 is a diagrammatic view showing the operation of the tine of FIG. 1, the forming of a pair of sub-cores by the tine of FIG. 1, and the deposition of such sub-cores atop the ground or turf surface thereon.

Each tine 2 carries a core splitter formed by wall 26 in lower section 10 thereof. Wall 26 splits or divides the aeration core 27 being formed within tine 2 into two substantially equally sized sub-cores 27a and 27b. In effect, wall 26 turns one larger aeration core 27 into two smaller sub-cores 27a and 27b. In this regard, smaller means smaller in cross-sectional area, i.e. the sub-cores 27a and 27b will have a smaller cross-sectional area taken in a plane perpendicular to the axis of elongation y than the corresponding cross-sectional area of the single larger aeration core 27 that would have been formed if wall 26 were absent. Both of these smaller sub-cores 27a and 27b will subsequently be ejected through exit 24 provided in middle section 14 of tine 2. See the diagrammatic representation of this as depicted in FIG. 6.

Wall 26 is preferably located primarily in lower section 10 of tine 2. Wall 26 extends in a plane extending along the centerline of gap 22 and along the axis of elongation y of tine 2. However, wall 26 is not as wide as gap 22, but is substantially narrower than gap 22. In the case of the example described above, namely of a tine with an outer diameter of 1.00" and a gap of 0.50", wall 26 has a thickness or width, identified as t in FIG. 2, of approximately 0.125".

Figure 3:
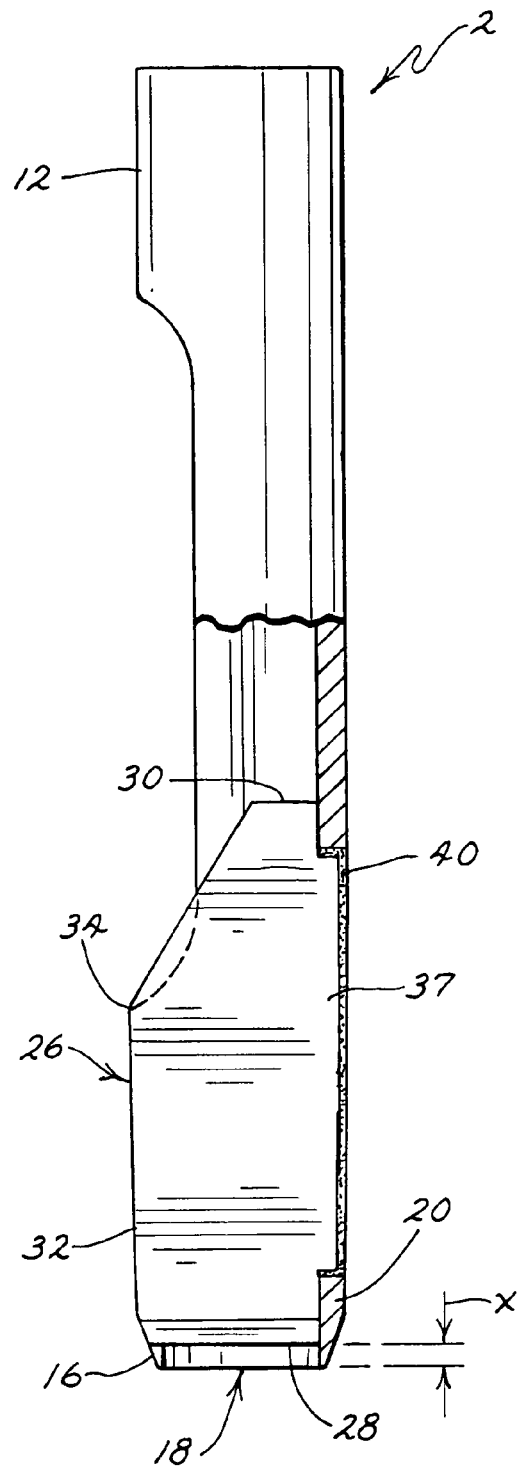
FIG. 3 is a side-elevational view of the tine of FIG. 1, with a portion thereof broken away and shown in cross-section to better illustrate the core splitting or dividing wall in the tine.
Figure 4:
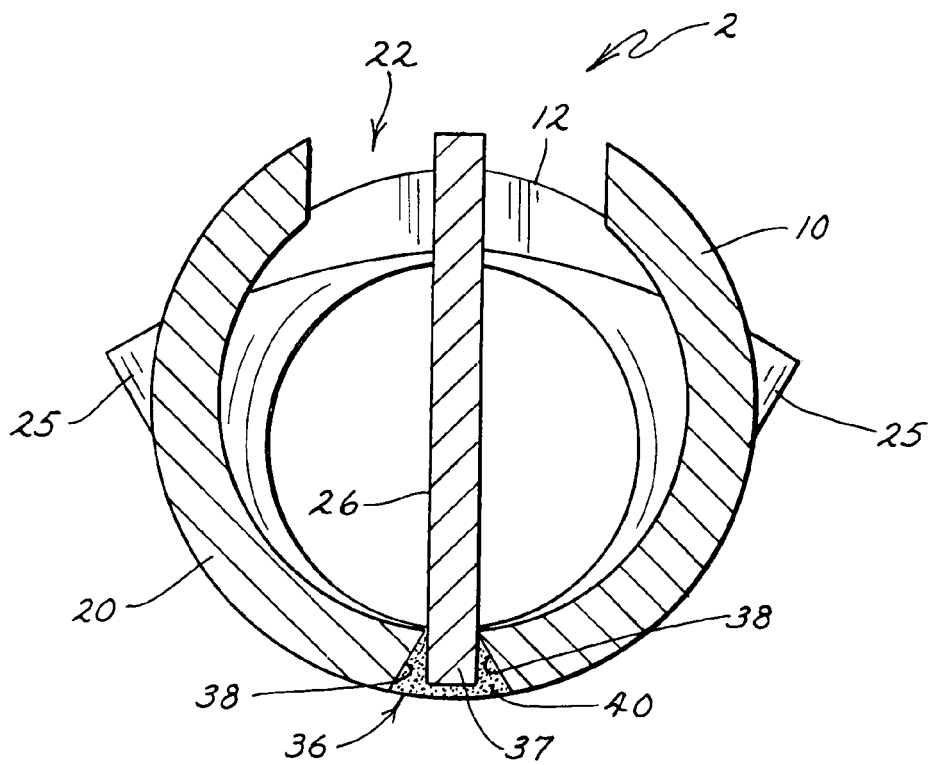
FIG. 4 is a cross-sectional view of the tine of FIG. 1 taken along lines 4-4 of FIG. 1.

Referring to tine 2 as shown in FIGS. 1 and 3, wall 26 has a substantially vertical leading edge 28 and a parallel substantially vertical trailing edge 30. Trailing edge 30 is shorter than leading edge 28. The upper edge 32 of wall 26 has an asymmetrical shape that includes a break 34 that marks a change in inclination in upper edge 32. The front portion of upper edge 32 is substantially parallel to edges of gap 22 between break 34 and the top corner of leading edge 28 while the rear portion of upper edge 32 of wall 26 slopes downwardly from break 34 to the top corner of trailing edge 30. Break 34 in upper edge 32 of wall 26 is generally aligned with the rear side of lower section 10 of tine 2.

Leading edge 28 of wall 26 is set slightly behind or inset from the open mouth 18 of the chamfered bottom edge 16 of lower section 10 of tine 2, i.e. by approximately 0.075" as shown at x in FIG. 3. Inset x allows tine 2 to wear away somewhat before wall 26 starts to wear away. Normally, tine 2 will wear faster than wall 26 so that wall 26 will eventually begin to protrude out through open mouth 18 of tine 2. This can be delayed using the aforementioned initial inset x of leading edge 28 of wall 26 behind open mouth 18 of tine 2. This serves to better equalize the wear rates between tine 2 and wall 26.

From its leading edge 28, wall 26 extends rearwardly along the entire length of lower section 10 of tine 2 and into the beginning of middle section 14 of tine 2. When looking down at wall 26 in a plan view as shown in FIG. 2, wall 26 has about two thirds of its length within lower section 10 of tine 2 and about one third of its length in middle section 14 of tine 2. The portion of wall 26 within middle section 14 extends over about the first quarter or so of the length of middle section 14 of tine 2.

However, if so desired, these proportions could be adjusted. For example, wall 26 could terminate at or adjacent the rear side of lower section 10 of tine 2 without extending very far, if at all, into middle section 14 of tine 2. Alternatively, wall 26 could extend further up into middle section 14. Wall 26 could also be located substantially or entirely within middle section 14. But, such alternative configurations sometimes plug more often in certain soil conditions than the configuration shown in the embodiment of FIGS. 1-6, which is thus the preferred, but not the only, embodiment of the invention.

In addition, referring again to FIG. 2, the portion of wall 26 within lower section 10 of tine 2 has a height substantially equal to the height of lower section 10 of tine 2. In other words, upper edge 32 of wall 26 is substantially flush with the radially outermost edges of gap 22 with wall 26 then extending all the way back to the opposite inner diameter of tine 2. The remaining portion of wall 26 comprising that portion extending into middle section 14 of tine 2 quickly decreases in height. Thus, the height of tine 2 at its trailing edge 30 is less than the height of sidewall 20 of tine 2 at exit 24.

Figure 5:
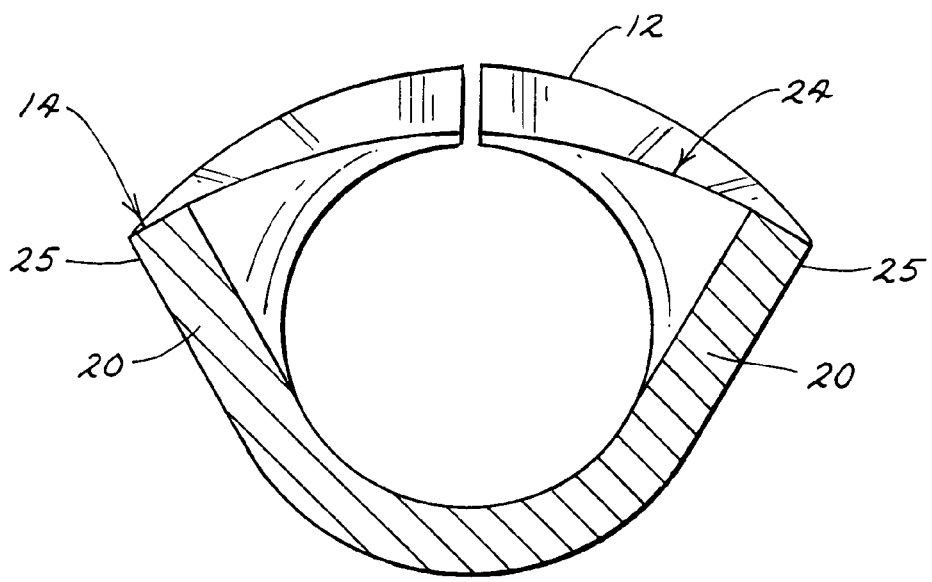
FIG. 5 is a cross-sectional view of the tine of FIG. 1 taken along lines 5-5 of FIG. 1.

Both tine 2 and the dividing wall 26 that is a part thereof are made from the types of steel typically used in the manufacture of aerator tines. Wall 26 is welded in place into tine 2 though other assembly methods could be used. A mounting slot 36 is provided in tine 2 opposite to gap 22 in lower section 10 and opposite to exit 24 at the beginning of middle section 14 of tine 2. Wall 26 includes a downwardly protruding tab 37 that is sized to be received in mounting slot 36 with some clearance therebetween. The sides 38 of mounting slot 36 can be beveled outwardly to provide a welding surface on either side of wall 26 as shown in FIG. 5. Wall 26 is then welded in place in mounting slot 36 by a plug weld 40 from the outside of tine 2 that fills in the clearance between tab 37 on wall 26 and the beveled sides 38 of mounting slot 36. Again, see FIG. 5. When so secured, wall 26 is rigid with tine 2.

In the operation of a tine 2 according to this invention, as tine 2 is pushed or punched into the ground during operation of aerator 4, wall 26 splits or divides the incoming aeration core into two smaller sub-cores 27a and 27b. In this regard, leading edge 28 of wall 26 can be sharpened or beveled as indicated at 42 in FIGS. 1 and 2. When these sub-cores 27a and 27b are subsequently ejected through exit 24 of tine 2 and deposited onto the turf, they are much smaller as described earlier than the single larger aeration core 27 that would normally have been deposited through exit 24 had wall 26 been absent. These aeration sub-cores 27a and 27b will dry much more quickly, e.g. in about one third of the time, than the larger aeration core 27 that would have otherwise been formed and deposited. Thus, the sub-cores 27a and 27b may be subsequently treated or picked up much earlier than would otherwise have been possible and the turf surface more quickly returned to its usual use. This is very advantageous in the golf and sports field markets.

Moreover, even in applications where the cores are simply left in place on top of the turf surface, such as in a homeowner's yard, the smaller sub-cores 27a and 27b will erode or disintegrate more quickly than the typical larger aeration core 27 that would have been left. This allows the sub-cores 27a and 27b to be more quickly dispersed back down into the turf canopy and to disappear from view. This is also an advantage even when subsequent mechanical treatment and/or pickup of the sub-cores 27a and 27b is not done.

Figure 7:
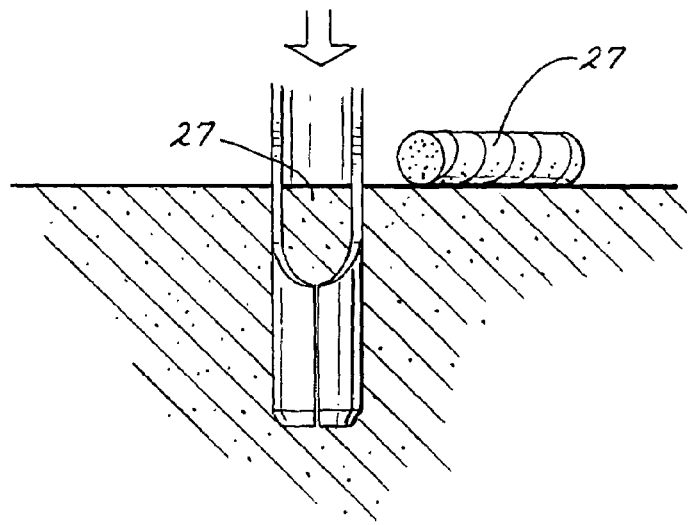
FIG. 7 is a diagrammatic view similar to FIG. 6, but showing the operation of a prior art tine, the forming of a single aeration core by the tine of FIG. 7, and the deposition of such single aeration core atop the ground or turf surface thereon.

The term sub-core as used herein is intended to mean the smaller aeration cores that are left when a larger aeration core is split into two parts. Thus, sub-cores are also aeration cores, but simply smaller versions of aeration cores. FIG. 7 shows the single larger aeration core 27 that is typically formed by the operation of a prior art tine. FIG. 6 shows the two smaller sub-cores 27a and 27b that is formed by the operation of the preferred embodiment of tine 2 disclosed herein.

In certain hard or heavy soil conditions in which the soil is quite self-adherent, operation of tine 2 will pull up and eject sub-cores 27a and 27b that are relatively solid. However, in certain lighter and looser soil conditions, such as sandy soil, dividing wall 26 also breaks up or disintegrates the sub-cores 27a and 27b into many smaller pieces and ejects the broken up particles of sub-cores 27a and 27b rather than solid sub-cores. This is also advantageous as the need for subsequent processing of sub-cores 27a and 27b using core disintegrating equipments is eliminated. This different result, i.e. ejecting solid sub-cores or broken up sub-cores, does not occur because of a difference in wall 26 or its placement in tine 2, but simply results from the use of tine 2 on different turf surfaces in which the underlying soil has different characteristics.

One tine 2 that has been found to work well for the purposes of this invention is one having a generally cylindrical configuration with a diameter of 1.00", an overall length of 5.75" with a lower section 10 having a length of 1.55", an upper section of 1.00", and a middle section 14 of 3.2", and a wall 26 having an overall length between its leading and trailing edges of 2.26".

While the use of a single dividing wall 26 to split one aeration core into two sub-cores is preferred, this invention is not limited to such a single dividing wall. More dividing walls and differently shaped dividing walls could be provided that could split a single aeration core into more than two sub-cores. However, since plugging of tine 2 will become more of a problem when trying to form many sub-cores, the use of a single dividing wall to form two generally equally sized sub-cores is preferred. While a side eject tine 2 has been shown herein, the invention could also be used with a top eject tine where the aeration sub-cores 27a and 27b would be ejected through the open top of upper section 12.

Various other modifications of this invention will be apparent to those skilled in the art. Thus, the scope of the invention shall be limited only by the appended claims.

I claim:

1. A tine for a turf aerator for aerating turf, wherein the turf aerator movably mounts and drives the tine in a manner that pushes or punches the tine downwardly into the ground to form an aeration hole in the turf, lifts the tine out of the aeration hole so formed, and then periodically repeats the process to form additional aeration holes, which comprises:
   a) a tine elongated along an axis of elongation;
   b) wherein at least a portion of the tine is hollow having a predetermined cross-sectional area measured in a plane perpendicular to the axis of elongation, wherein the hollow portion of the tine includes a lower section having a predetermined length along the axis of elongation and having an open mouth that first contacts the ground as the tine is pushed or punched downwardly into the ground, wherein the lower section of the tine has an open gap along one side of the lower section with the gap extending along a substantial portion of the length of the lower section and with the gap having a predetermined width measured in a plane perpendicular to the axis of elongation, wherein the hollow portion forms an aeration core out of the turf which core is received within the hollow portion as the tine is pushed or punched downwardly into the ground to form the aeration hole; and
   c) a wall located at least partially in the lower section of the hollow portion of the tine, the wall extending sufficiently across one dimension of the predetermined cross-sectional area to split or divide the predetermined cross-sectional area into at least two substantially separate cross-sectional areas that are each smaller than the predetermined cross-sectional area, wherein the portion of the wall in the lower section of the tine is located in a plane that extends along the axis of elongation of the tine and that also extends along a centerline of the gap such that the wall portion in the lower section of the tine is placed on edge relative to the gap to be exposed by the gap in the lower section, and wherein the entirety of the on edge wall portion in the lower section of the tine has a wall thickness measured in a plane perpendicular to the axis of elongation that is substantially narrower than the width of the gap.

2. The tine of claim 1, wherein the wall is a single wall is used to split or divide the predetermined cross-sectional area into a pair of smaller cross-sectional areas.

3. The tine of claim 2, wherein the pair of smaller cross-sectional areas are substantially equal in size to one another.

4. The tine of claim 3, wherein the hollow portion of the tine is substantially cylindrical and the pre-determined cross-sectional area is substantially circular, and wherein the wall extends along a diameter of the pre-determined cross-sectional area to bisect the pre-determined cross-sectional area.

5. The tine of claim 1, wherein the hollow portion of the tine includes a middle section with a slot in one side thereof.

6. The tine of claim 5, wherein the wall is positioned in both the lower section and the middle section of the hollow portion with a portion of the wall extending into a beginning part of the middle section to be also located on edge relative to the slot to be exposed by the slot in the middle section.

7. The tine of claim 6, wherein the width of the gap is approximately half as wide as a width of the slot, and the thickness of the wall is less than half the width of the gap.

8. The tine of claim 5, wherein the portion of the wall in the lower section of the tine extends over a majority of the length of the lower section of the tine.

9. The tine of claim 8, wherein the portion of the wall in the lower section of the tine is longer than the portion of the wall in the middle section of the tine.

* * * * *